(12) United States Patent
Klein et al.

(10) Patent No.: US 11,951,610 B2
(45) Date of Patent: Apr. 9, 2024

(54) OPENING APPARATUS FOR USE WITH A MULTI-PIECE, HINGED, HYDROPONIC TOWER

(71) Applicant: MJNN, LLC, South San Francisco, CA (US)

(72) Inventors: Brice Klein, San Francisco, CA (US); Matthew Matera, San Francisco, CA (US); Andy Dubel, Pacifica, CA (US); Merritt Jenkins, San Francisco, CA (US); Tamara Hasoon, Redwood City, CA (US); Maria Malone, San Francisco, CA (US); Anna Olson, San Mateo, CA (US); Mark Cuson, Los Altos, CA (US)

(73) Assignee: MJNN LLC, South San Francisco, CA (US)

( * ) Notice: Subject to any disclaimer, the term of this patent is extended or adjusted under 35 U.S.C. 154(b) by 1085 days.

(21) Appl. No.: 16/376,878

(22) Filed: Apr. 5, 2019

(65) Prior Publication Data
US 2020/0037525 A1    Feb. 6, 2020

Related U.S. Application Data

(60) Provisional application No. 62/764,400, filed on Jul. 31, 2018, provisional application No. 62/764,399, filed on Jul. 31, 2018.

(51) Int. Cl.
*A01G 31/06* (2006.01)
*B25J 15/00* (2006.01)
(Continued)

(52) U.S. Cl.
CPC .......... *B25J 15/0019* (2013.01); *A01G 31/06* (2013.01); *B65G 13/02* (2013.01); *E05C 19/06* (2013.01);
(Continued)

(58) Field of Classification Search
CPC .. A01G 31/06; A01G 2009/003; A01G 25/16; A01G 31/02; A01G 9/022; A01G 9/023
See application file for complete search history.

(56) References Cited

U.S. PATENT DOCUMENTS

| 1,263,836 A | 4/1918 | Ball |
| 1,709,860 A | 4/1929 | Lovett |
| (Continued) | | |

FOREIGN PATENT DOCUMENTS

| CN | 2441299 Y | 8/2001 |
| CN | 204616518 U | 9/2015 |
| (Continued) | | |

OTHER PUBLICATIONS

U.S. Appl. No. 62/742,751, Oct. 8, 2018, Yara Thomas, Entire Document.

(Continued)

*Primary Examiner* — Magdalena Topolski
*Assistant Examiner* — Katherine Anne Kloecker
(74) *Attorney, Agent, or Firm* — Almanac IP Advisors LLP

(57) ABSTRACT

A tower opening apparatus is provided that is configured to simplify the opening of a multi-piece, hinged, hydroponic tower. The hydroponic tower opening apparatus utilizes a collection of static and continuously moving components (e.g., motor driven drive rollers, alignment rollers, stationary wedges, longitudinal ramps, etc.) to open a hydroponic tower as it passes through the apparatus. In particular, as the tower is driven through the opening apparatus, the fastener(s) holding the face plate(s) to the tower body is released by a wedge(s). After the fastener(s) is released, the face plate(s) is partially rotated about the tower body, thereby partially opening the tower cavity(s). Next a longitudinal (Continued)

ramp(s) continues to rotate the face plate(s) relative to the tower body, moving the face plate(s) to a fully open position.

25 Claims, 14 Drawing Sheets

(51) Int. Cl.
| | |
|---|---|
| B65G 13/02 | (2006.01) |
| E05C 19/06 | (2006.01) |
| E05D 1/04 | (2006.01) |
| E05D 1/06 | (2006.01) |
| E05F 1/00 | (2006.01) |
| E05F 15/60 | (2015.01) |

(52) U.S. Cl.
CPC ............... *E05D 1/04* (2013.01); *E05D 1/06* (2013.01); *E05F 1/00* (2013.01); *E05F 15/60* (2015.01); *E05Y 2900/60* (2013.01)

(56) References Cited

U.S. PATENT DOCUMENTS

| | | | |
|---|---|---|---|
| 2,242,304 A | 5/1941 | Johnson | |
| 2,842,920 A | 7/1958 | Carkhuff et al. | |
| 3,254,448 A | 6/1966 | Othmar | |
| 3,299,615 A | 1/1967 | Singer | |
| 3,896,587 A | 7/1975 | Insalaco | |
| 4,033,072 A | 7/1977 | Kobayashi et al. | |
| 4,075,785 A | 2/1978 | Jones | |
| 4,454,684 A * | 6/1984 | O'Hare | A01G 31/06 |
| | | | 47/59 R |
| 4,569,150 A | 2/1986 | Carlson et al. | |
| 4,683,674 A | 8/1987 | Faul | |
| 4,992,942 A | 2/1991 | Bauerle et al. | |
| 5,031,359 A | 7/1991 | Moffett | |
| 5,249,406 A * | 10/1993 | Kalmanides | B65B 7/26 |
| | | | 53/377.6 |
| 5,251,399 A | 10/1993 | Rasmussen | |
| 5,363,594 A | 11/1994 | Davis | |
| 5,555,676 A | 9/1996 | Lund | |
| 5,584,408 A | 12/1996 | Orkisz | |
| 5,687,543 A | 11/1997 | Lam | |
| 5,841,883 A | 11/1998 | Kono et al. | |
| 5,913,477 A | 6/1999 | Dean | |
| 5,918,416 A | 7/1999 | Ammann, Jr. | |
| 5,934,017 A | 8/1999 | Ho | |
| 6,477,805 B2 | 11/2002 | Ware | |
| 7,143,544 B2 | 12/2006 | Roy | |
| 7,171,782 B2 | 2/2007 | Felknor et al. | |
| 7,373,753 B1 | 5/2008 | Caruso | |
| 8,184,570 B2 | 5/2012 | Chun et al. | |
| 8,250,804 B2 | 8/2012 | Chang | |
| 8,327,582 B2 | 12/2012 | Storey | |
| 8,365,466 B1 | 2/2013 | Storey | |
| 8,418,403 B1 | 4/2013 | Nuttman | |
| 8,761,769 B2 | 6/2014 | Carpenter | |
| 8,800,252 B2 | 8/2014 | Vodonos et al. | |
| 8,867,666 B2 | 10/2014 | Kim et al. | |
| 8,919,041 B2 | 12/2014 | Topping | |
| 8,966,819 B1 | 3/2015 | Cosmann | |
| 9,374,952 B1 | 6/2016 | Cross | |
| 9,374,953 B2 | 6/2016 | Martin et al. | |
| 9,742,577 B2 | 8/2017 | Cai | |
| 9,814,186 B2 | 11/2017 | Anderson et al. | |
| 10,022,873 B2 | 7/2018 | Larrea-Tamayo et al. | |
| 10,123,494 B2 | 11/2018 | Janssen | |
| 10,499,575 B2 | 12/2019 | Stoltzfus et al. | |
| 10,682,769 B2 | 6/2020 | Matera et al. | |
| 10,694,689 B2 | 6/2020 | Klein et al. | |
| 10,701,875 B2 | 7/2020 | Klein et al. | |
| 10,729,081 B2 | 8/2020 | Klein et al. | |
| 10,736,285 B2 * | 8/2020 | Smith | A01G 31/06 |
| 2003/0043764 A1 | 3/2003 | Kim et al. | |
| 2003/0089037 A1 | 5/2003 | Ware | |
| 2005/0083977 A1 | 4/2005 | Moulsley et al. | |
| 2005/0132666 A1 | 6/2005 | Dyke et al. | |
| 2006/0092973 A1 | 5/2006 | Petrovic et al. | |
| 2006/0156624 A1 | 7/2006 | Roy et al. | |
| 2008/0025240 A1 | 1/2008 | Casaccia et al. | |
| 2008/0078118 A1 | 4/2008 | Bissonnette et al. | |
| 2008/0302010 A1 * | 12/2008 | Cordon | A01G 31/02 |
| | | | 47/62 R |
| 2009/0199470 A1 | 8/2009 | Capen et al. | |
| 2009/0223126 A1 | 9/2009 | Garner et al. | |
| 2010/0130219 A1 | 5/2010 | Cave et al. | |
| 2010/0146855 A1 | 6/2010 | Ma | |
| 2011/0083362 A1 | 4/2011 | Rosenberg | |
| 2011/0107667 A1 | 5/2011 | Laurence et al. | |
| 2013/0152468 A1 * | 6/2013 | Huang | A01G 31/06 |
| | | | 47/65.5 |
| 2014/0000162 A1 | 1/2014 | Blank | |
| 2014/0130414 A1 | 5/2014 | Storey | |
| 2014/0259904 A1 | 9/2014 | Collard | |
| 2014/0290137 A1 | 10/2014 | Nagels et al. | |
| 2015/0300011 A1 | 10/2015 | Otamendi | |
| 2015/0313104 A1 | 11/2015 | Cottrell | |
| 2015/0334930 A1 | 11/2015 | Stoltzfus et al. | |
| 2016/0029581 A1 * | 2/2016 | Martin | A01G 31/06 |
| | | | 47/62 A |
| 2016/0050863 A1 | 2/2016 | Graber | |
| 2016/0066525 A1 | 3/2016 | Duquesnay et al. | |
| 2016/0085522 A1 | 3/2016 | Chauhan et al. | |
| 2016/0120141 A1 | 5/2016 | Stolzfus et al. | |
| 2016/0270311 A1 | 9/2016 | Martin et al. | |
| 2017/0055461 A1 | 3/2017 | Neuhoff, Jr. et al. | |
| 2017/0055473 A1 | 3/2017 | Baker | |
| 2017/0071137 A1 * | 3/2017 | Mehler | A01G 9/026 |
| 2017/0105358 A1 | 4/2017 | Wilson | |
| 2017/0105372 A1 | 4/2017 | Bryan | |
| 2017/0181393 A1 | 6/2017 | Nelson | |
| 2017/0202164 A1 | 7/2017 | Dufresne | |
| 2017/0231167 A1 | 8/2017 | Storey | |
| 2017/0238486 A1 | 8/2017 | Feo et al. | |
| 2017/0332544 A1 | 11/2017 | Conrad et al. | |
| 2017/0339841 A1 | 11/2017 | Monasterio | |
| 2018/0000029 A1 | 1/2018 | Martin et al. | |
| 2018/0007849 A1 | 1/2018 | Cohen et al. | |
| 2018/0014486 A1 | 1/2018 | Creechley et al. | |
| 2018/0042186 A1 | 2/2018 | Kop | |
| 2018/0084739 A1 | 3/2018 | Bottari | |
| 2018/0092314 A1 | 4/2018 | McGuinness et al. | |
| 2018/0168108 A1 | 6/2018 | Foreman et al. | |
| 2018/0199526 A1 * | 7/2018 | Guo | A01G 31/02 |
| 2018/0213734 A1 | 8/2018 | Smith et al. | |
| 2018/0295800 A1 | 10/2018 | Kiernan | |
| 2018/0310499 A1 | 11/2018 | Buuren et al. | |
| 2018/0325052 A1 | 11/2018 | Gru et al. | |
| 2018/0362265 A1 | 12/2018 | Millar et al. | |
| 2019/0082617 A1 | 3/2019 | Moffitt et al. | |
| 2019/0082627 A1 | 3/2019 | Moffitt et al. | |
| 2019/0124866 A1 | 5/2019 | Maxwell | |
| 2019/0200551 A1 | 7/2019 | Walters | |
| 2019/0269079 A1 | 9/2019 | Klein et al. | |
| 2019/0269080 A1 | 9/2019 | Whitworth et al. | |
| 2019/0269081 A1 | 9/2019 | Whitworth et al. | |
| 2019/0269083 A1 | 9/2019 | Klein et al. | |
| 2019/0297787 A1 | 10/2019 | Klein et al. | |
| 2020/0008366 A1 | 1/2020 | Klein et al. | |
| 2020/0008378 A1 | 1/2020 | Buuren et al. | |
| 2020/0037525 A1 | 2/2020 | Klein et al. | |

FOREIGN PATENT DOCUMENTS

| | | | |
|---|---|---|---|
| CN | 104088380 B | 7/2016 | |
| CN | 205567360 U | 9/2016 | |
| CN | 106193966 A * | 12/2016 | |
| CN | 206149963 U | 5/2017 | |
| CN | 108005554 A * | 5/2018 | ........... E05D 13/003 |
| CN | 108015061 A | 5/2018 | |
| CN | 208446303 U | 2/2019 | |
| DE | 102016104615 A1 | 9/2017 | |
| EP | 2821149 A1 | 1/2015 | |
| JP | 4913009 B2 | 4/2012 | |

(56) References Cited

FOREIGN PATENT DOCUMENTS

| KR | 100570834 B1 * | 4/2006 |
| KR | 20120000852 A | 1/2012 |
| KR | 20160064794 A * | 6/2016 |
| WO | 2017100377 A1 | 6/2017 |
| WO | 2017109279 A1 | 6/2017 |
| WO | 2021055001 A1 | 3/2021 |

OTHER PUBLICATIONS

Written Opinion for PCT/US2018/060120 dated Feb. 19, 2019, 11 pgs.
Written Opinion for PCT/US2018/063297 dated Feb. 20, 2019, 9 pgs.
Chinese Office Action; Application No. 201980050203.2; dated Jan. 9, 2022; 5 pages.
International Search Report for PCT/US2019/035951 dated Oct. 4, 2019, 3 pgs.
International Search Report for PCT/US2019/035972 dated Oct. 4, 2019, 3 pgs.
Non-Final Office Action dated Mar. 24, 2020 in U.S. Appl. No. 16/397,142, 12 pgs.
Notice of Allowance dated Apr. 21, 2020 in U.S. Appl. No. 16/397,142, 9 pgs.
Written Opinion for PCT/US2019/035951 dated Oct. 4, 2019, 5 pgs.
Written Opinion for PCT/US2019/035972 dated Oct. 4, 2019, 4 pgs.
Restriction Requirement mailed in U.S. Appl. No. 16/406,536 dated Aug. 27, 2021, 7 pgs.
Non-Final Office Action dated May 7, 2020 in U.S. Appl. No. 15/968,425, 14 pgs.
Notice of Allowance dated May 19, 2020 in U.S. Appl. No. 15/968,425, 5 pgs.
European Extended Examination Report, Application No. 19843228.8, dated Feb. 23, 2022, 56 pages.
Singapore Patent Application No. 11202100806X, Written Opinion, dated Sep. 5, 2022, 11 pages.
International Search Report for PCT/US2018/060120 dated Feb. 19, 2019, 4 pages.
International Search Report for PCT/US2018/063297 dated Feb. 20, 2019, 2 pages.
Non-Final Office Action dated Jun. 7, 2022 in U.S. Appl. No. 16/406,536, 16 pgs.
Final Office Action dated Dec. 22, 2022 in U.S. Appl. No. 16/406,536, 16 pgs.
Non-Final Office Action dated Jun. 13, 2023 in U.S. Appl. No. 17/263,530, 16 pgs.
Notice of Allowance dated May 30, 2023 in U.S. Appl. No. 16/406,536, 8 pgs.

* cited by examiner

OPENING APPARATUS FOR USE WITH A MULTI-PIECE, HINGED, HYDROPONIC TOWER

CROSS-REFERENCE TO RELATED APPLICATION

This application claims benefit of the filing dates of U.S. Provisional Patent Application Ser. Nos. 62/764,400, filed 31 Jul. 2018, and 62/764,399, filed 31 Jul. 2018, the disclosures of which are incorporated herein by reference for any and all purposes.

FIELD OF THE INVENTION

The present invention relates generally to hydroponic growing systems and, more particularly, to a device and system configured to open a multi-piece, hinged, hydroponic tower in order to simplify tower maintenance.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides an apparatus that simplifies hydroponic tower maintenance between use cycles.

SUMMARY OF THE INVENTION

A hydroponic tower opening apparatus is provided that is configured to open a multi-piece, hinged, hydroponic tower, where the hydroponic tower is comprised of (i) a tower body that defines at least a first tower cavity, where a first edge portion of the tower body includes a first tower body hinge member; (ii) a first tower face plate, where an edge portion of the first tower face plate includes a first face plate hinge member, where the first tower face plate is hingeably coupled to the tower body via the first tower body hinge member and the first face plate hinge member, where the first tower face plate is positionable relative to the tower body in at least a first tower cavity closed position and a first tower cavity open position, and where the first tower face plate includes a first plurality of plant container cut-outs configured to accept a first plurality of plant containers; and (iii) a first fastener configured to temporarily latch the first tower face plate to the tower body when the first tower face plate is in the first tower cavity closed position. The hydroponic tower opening apparatus is comprised of (i) a drive system that propels the multi-piece hydroponic tower through the hydroponic tower opening apparatus; (ii) an alignment system that aligns the multi-piece hydroponic tower body within the hydroponic tower opening apparatus; and (iii) a tower opening system configured to (a) release the first fastener and unlatch the first tower face plate from the tower body, and (b) move the first tower face plate from the first tower cavity closed position to the first tower cavity open position.

In one aspect of the invention, the first fastener may be comprised of a first snap-fit fastener and the tower opening system may be comprised of a first wedge member configured to unsnap the first snap-fit fastener as the multi-piece hydroponic tower is propelled through the hydroponic tower opening apparatus. The leading edge of the first wedge member is inserted into the first tower cavity as the multi-piece hydroponic tower is propelled through the hydroponic tower opening apparatus, the first wedge member being configured to force the first snap-fit fastener to unlatch and to force the first tower face plate to rotate about the first tower body hinge member as the multi-piece hydroponic tower passes by the first wedge member. The tower opening system may further include at least one set of tower body alignment rollers that are configured to locate and align the sides of the tower. The tower opening system may further include one or more idler rollers that are configured to limit the initial rotation of the first tower face plate about the first tower body hinge member. The idler rollers may be located before and/or after the first wedge member relative to the entrance of the hydroponic tower opening apparatus. The tower opening system may further include a first longitudinal ramp which is sloped within the hydroponic tower opening apparatus. The first longitudinal ramp is located further from the entrance of the hydroponic tower opening apparatus than the first wedge member and is configured to continue to force rotation of the first tower face plate about the first tower body hinge member, where the first wedge member forces the first tower face plate to a partially open position and the first longitudinal ramp forces the first tower face plate to a fully open position (e.g., the first tower cavity open position) relative to the tower body. An idler roller may be located adjacent to a portion of the first longitudinal ramp, the idler roller configured to control rotation of the first tower face plate about the first tower body hinge member as the multi-piece hydroponic tower passes by the first longitudinal ramp.

In another aspect, the drive system may be comprised of a plurality of drive rollers, where at least a subset of the plurality of drive rollers is coupled to a drive motor and configured to contact the tower body along at least a first tower body side. Operation of the drive motor forces rotation of the subset of drive rollers, thereby propelling the multi-piece hydroponic tower through the hydroponic tower opening apparatus. The alignment system may be comprised of a plurality of alignment rollers configured to contact the tower body along at least a second tower body side.

In another aspect, the multi-piece hydroponic tower may include (i) a first modified V-shaped groove running along the length of the first side of the tower body, the first modified V-shaped groove comprising a first inner groove wall, a first sloped groove wall that couples the first edge of the first inner groove wall to the first edge of the first side of the tower body, and a second sloped groove wall that couples the second edge of the first inner groove wall to the second edge of the first side of the tower body; and (ii) a second modified V-shaped groove running along the length of the second side of the tower body, the second modified V-shaped groove comprising a second inner groove wall, a third sloped groove wall that couples the first edge of the second inner groove wall to the first edge of the second side of the tower body, and a fourth sloped groove wall that couples the second edge of the second inner groove wall to the second edge of the second side of the tower body. The first inner groove wall may be substantially parallel to the first side of the tower body and substantially perpendicular to the first tower cavity rear wall, and the second inner groove wall may be substantially parallel to the second side of the tower body and substantially perpendicular to the first tower cavity rear wall. The drive system may include a plurality of drive rollers, wherein a first subset of drive rollers is coupled to a drive motor and configured to contact the tower body within the first modified V-shaped groove, preferably contacting the tower body via the first inner groove wall. Operation of the drive motor forces rotation of the first subset of drive rollers, thereby propelling the multi-piece hydroponic tower through the hydroponic tower opening apparatus. A second subset of drive rollers is not coupled to the drive motor and is configured to contact the tower body within the second modified V-shaped groove, preferably contacting the tower body via the second inner groove wall. The second subset of drive rollers may be mounted via a pneumatic or spring coupler and configured to apply pressure to the tower body via the second inner groove wall. The alignment system may include a plurality of alignment rollers configured as alignment roller pairs. One of the alignment rollers of each alignment roller pair is configured to contact the tower body within the first modified V-shaped groove, preferably contacting the tower body via the first and second sloped groove walls, and a second one of the alignment rollers of each alignment roller pair is configured to contact the tower body within the second modified V-shaped groove, preferably contacting the tower body via the third and fourth sloped groove walls.

In another aspect, the multi-piece hydroponic tower may be a dual-sided hydroponic tower with the tower body defining first and second tower cavities. In this configuration the first body hinge member of the first edge portion of the tower body corresponds to the first tower cavity. A second tower body hinge member of a second edge portion of the tower body corresponds to the second tower cavity. The dual-sided hydroponic tower further comprises (i) a second tower face plate, where an edge portion of the second tower face plate includes a second face plate hinge member, where the second tower face plate is hingeably coupled to the tower body via the second tower body hinge member and the second face plate hinge member, where the second tower face plate is positionable relative to the tower body in at least a second tower cavity closed position and a second tower cavity open position, and where the second tower face plate includes a second plurality of plant container cut-outs configured to accept a second plurality of plant containers; and (ii) a second fastener configured to temporarily latch the second tower face plate to the tower body when the second tower face plate is in the second tower cavity closed position. The tower opening system is further configured to (a) release the second fastener and unlatch the second tower face plate from the tower body, and (b) move the second tower face plate from the second tower cavity closed position to the second tower cavity open position. In this dual-sided configuration, preferably the first modified V-shaped groove is centered between the first tower cavity and the second tower cavity, and the second modified V-shaped groove is centered between the first tower cavity and the second tower cavity. The first inner groove wall may be substantially parallel to the first side of the tower body and substantially perpendicular to the first tower cavity rear wall, and the second inner groove wall may be substantially parallel to the second side of said tower body and substantially perpendicular to the second tower cavity rear wall.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. The same reference label on different figures should be understood to refer to the same component or a component of similar functionality. Additionally, multiple labels using the same numerical label and differing only in the letter label (e.g., 1401A and 1401B) refer to components of the same or similar functionality but located in different locations within the device (e.g., left and right configured components that are of the same general design and perform the same general function).

DESCRIPTION OF THE SPECIFIC EMBODIMENTS

Figure 1:
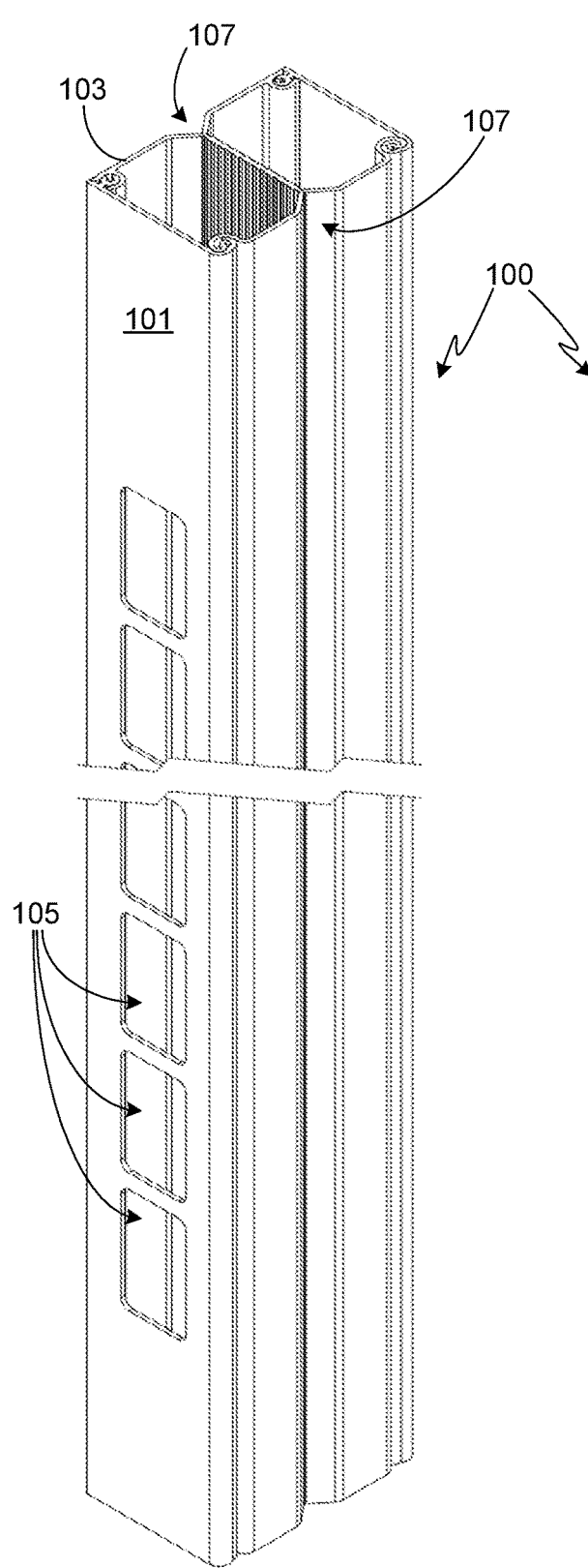
FIG. 1 provides a perspective view of an exemplary dual-sided, multi-piece hydroponic tower with hingeably coupled front face plates, this view showing the face plates in the closed position.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In accordance with the invention, an apparatus is disclosed that provides a means for automatically opening the face of a hinged hydroponic tower, thereby simplifying tower maintenance in general, and tower cleaning in particular. Since the face plates remain attached to the tower body throughout the cleaning process, it is easier to maintain part alignment and to insure that each face plate is properly associated with the appropriate tower body and, assuming a double-sided tower body, that each face plate is properly associated with the appropriate side of a specific tower body. Additionally, if the planting and/or harvesting operations are performed with the face plate in the open position, for the dual-sided configuration both face plates can be opened and simultaneously planted and/or harvested, thus eliminating the step of planting and/or harvesting one side and then rotating the tower and planting and/or harvesting the other side.

As described in detail below, the tower opening apparatus is comprised of several primary components: (i) an alignment system that ensures that the tower maintains proper alignment as it passes through the opening apparatus; (ii) a drive system that forces the tower through the apparatus; (iii) opening members that force the initial separation of the tower face(s) from the tower body; and (iv) guides that control the face opening operation.

The hydroponic tower opening apparatus of the invention can be configured to work with a variety of tower designs, typically by altering the location of the various alignment, drive and guide members in order to take into account the dimensions of the intended hydroponic tower as well as to ensure proper alignment with the various features of the intended tower. In order to clarify operation of the disclosed opening apparatus, the invention is illustrated using the dual-sided, multi-piece hydroponic tower described in co-pending and co-assigned U.S. patent application Ser. No. 15/968,425, filed 1 May 2018, the disclosure of which is incorporated herein for any and all purposes. It should be understood, however, that the present invention may also be configured for use with a single-sided, multi-piece hydroponic tower such as that disclosed in U.S. patent application Ser. No. 15/968,425, as well as other hydronic tower designs, and therefore the description and illustrated embodiments contained herein should not be viewed as limiting the disclosed opening apparatus to a particular hydroponic tower.

Figure 2:
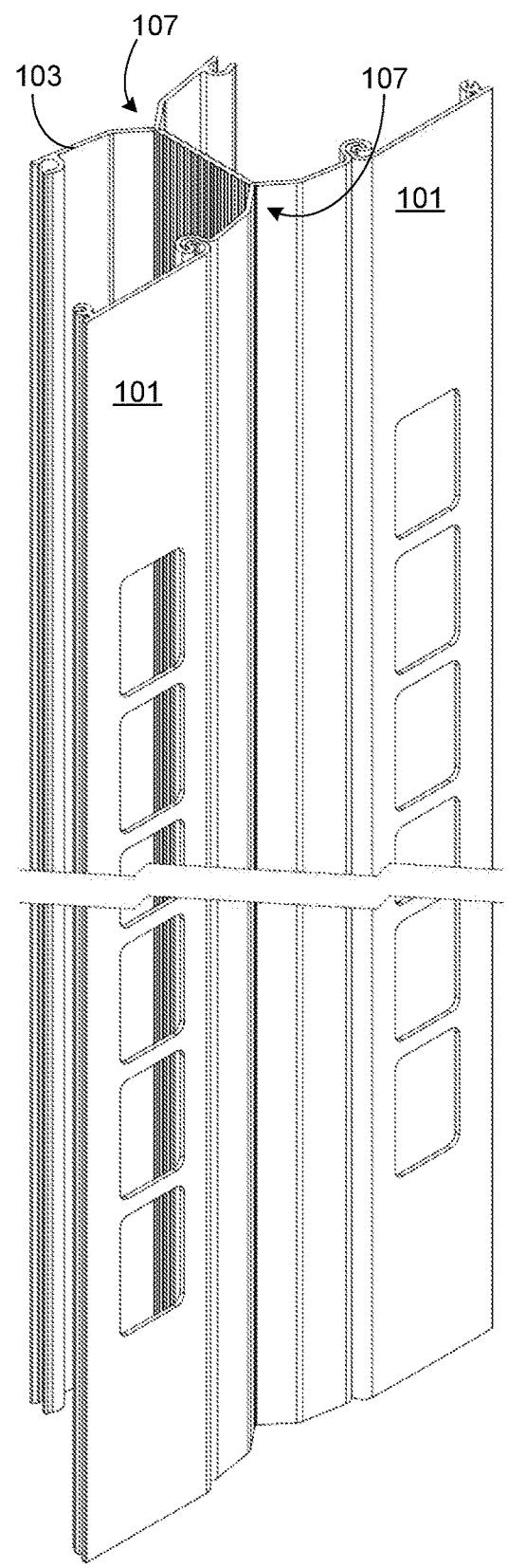
FIG. 2 provides a perspective view of the dual-sided, multi-piece hydroponic tower shown in FIG. 1, this view showing the face plates in the open position.

FIGS. 1 and 2 provide perspective views of an exemplary dual-sided, multi-piece hydroponic tower 100 in which each front face plate 101 is hingeably coupled to the tower body 103, this configuration being described in detail in U.S. patent application Ser. No. 15/968,425. In FIG. 1 each front face plate 101 is in the closed position while in FIG. 2 face plates 101 are shown in the open position. Although any of a variety of materials can be used in the manufacture of the tower, preferably the tower is fabricated from plastic (e.g., polyethylene, polypropylene, polyvinyl chloride (PVC), polytetrafluoroethylene, acrylonitrile butadiene styrene (ABS), etc.). In at least one embodiment, the tower body is fabricated from a PVC plastic and the tower face plates are fabricated from an ABS plastic. Preferably the materials used to fabricate the tower are opaque in order to prevent light from entering the tower, thus helping to minimize algae growth. Additionally, in at least one configuration the tower materials are white, thereby increasing the amount of light reflected back onto the plants.

In FIGS. 1 and 2, tower 100 includes a plurality of cut-outs 105. Each cut-out 105 is sized to accommodate a plant plug holder (not shown in FIGS. 1 and 2). A variety of designs and configurations may be used for the individual plant plug holders. Exemplary plant plug holders are described in detail in co-assigned and co-pending U.S. patent application Ser. No. 15/910,445, filed 2 Mar. 2018, and U.S. patent application Ser. No. 15/910,796, filed 2 Mar. 2018, the disclosures of which are incorporated herein for any and all purposes. It should be understood, however, that the tower opening apparatus disclosed in the present application is not limited to use with a particular plant plug holder. As such, cut-outs 105 are only meant to illustrate, not limit, the present tower design and it should be understood that the present invention is equally applicable to hinged hydroponic towers utilizing other cut-out designs.

Figure 3:
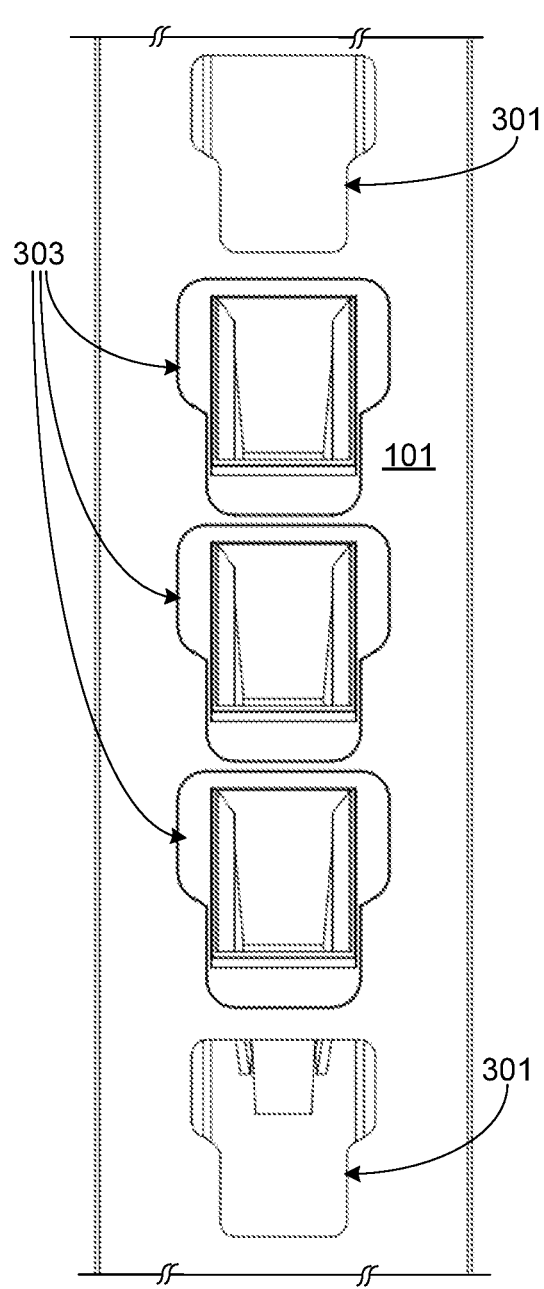
FIG. 3 provides a front planar view of a portion of a hydroponic tower containing several plant plug holders.
Figure 4:
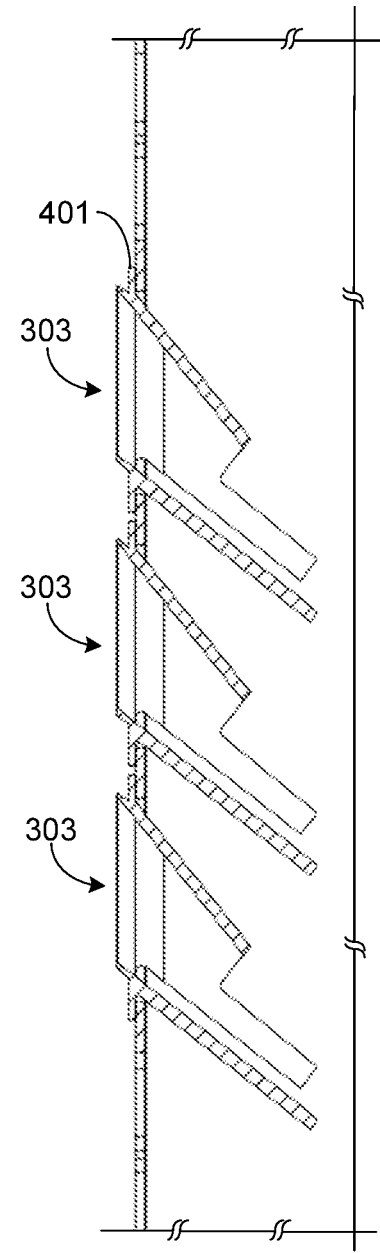
FIG. 4 provides a side cross-sectional view of the tower assembly shown in FIG. 3.
Figure 5:
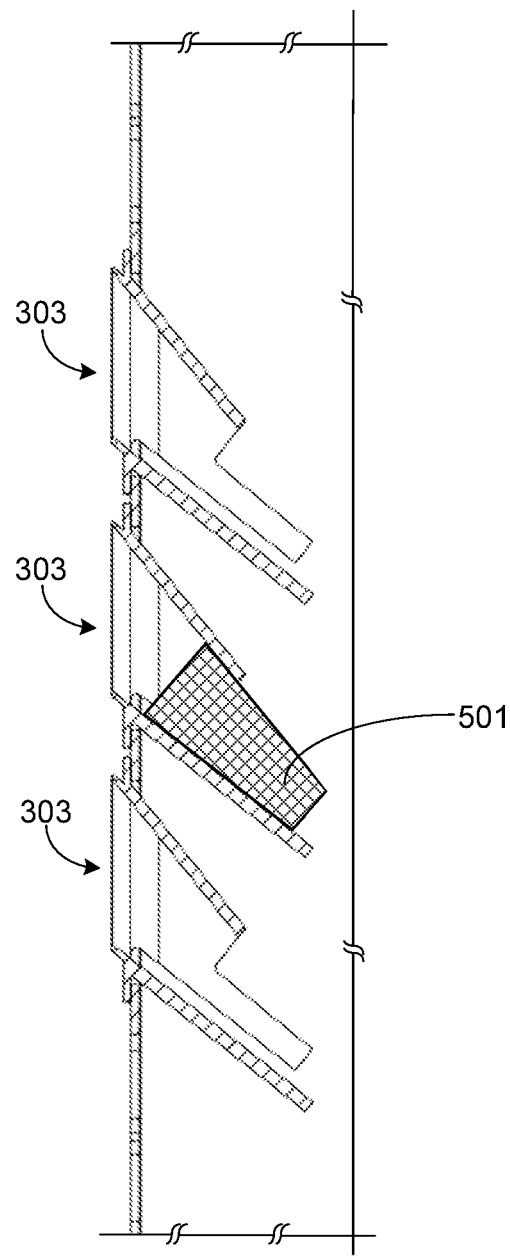
FIG. 5 provides the same view as that shown in FIG. 4, with the inclusion of a plant plug within one of the plant plug holders.

FIG. 3 provides a front planar view of a portion of a hydroponic tower assembly utilizing an alternate cut-out design 301. Note that in this view, plant plug holders 303 are only inserted within the three middle cut-outs 301. In this illustration, uppermost and lowermost cut-outs 301 are open. FIG. 4 provides a vertical cross-sectional view of the portion of the tower assembly shown in FIG. 3. FIG. 5 provides the same cross-sectional view as that shown in FIG. 4, with the addition of a plant plug 501 within the middle plant plug holder 303. Note that in FIG. 5 only the plant plug is shown, i.e., there is no seedling or mature plant contained within plug 501. Additionally, note that FIGS. 4 and 5 only illustrate one side of a dual-sided hydroponic tower such as the tower shown in FIGS. 1 and 2.

The plant plug holders used with the invention are preferably fabricated from plastic (e.g., polyethylene, polypropylene, polyvinyl chloride (PVC), polytetrafluoroethylene, acrylonitrile butadiene styrene (ABS), etc.), for example using injection molding. As with the tower face plates, preferably the plant plug holders are manufactured using an opaque plastic (e.g., ABS) that is colored white to minimize algae growth within the tower and increase reflected light.

Typically the plant plug holders, e.g., holders 303, are attached to tower face 101 via edge member 401, where edge member 401 encircles the plant container opening as shown. Edge member 401 extends out and away from the sides of the plug holder, thereby allowing the back surface of the edge member to be sealed to the tower face. While the plug holder does not have to be sealed to the tower face, sealing is preferred in order to inhibit leaking between the two components. Preferably the seal completely circumscribes the plant container opening. Although a variety of techniques can be used to seal the two components together, preferably they are either bonded together (e.g., solvent bonding) or welded together (e.g., ultrasonic welding).

In tower 100, a large "V" shaped groove 107 runs along the length of the tower, and on either side of the tower as shown in FIGS. 1 and 2. Preferably groove 107 is centered on the side of tower, evenly splitting the two tower cavities. If the present invention is used with a single-sided tower, preferably the tower still includes a groove, thereby providing a simplified means for tower alignment. While the invention can be used with a tower that utilizes a V-shaped groove, preferably a modified groove shape is employed as illustrated in FIGS. 6 and 7.

Figures 6, 7:
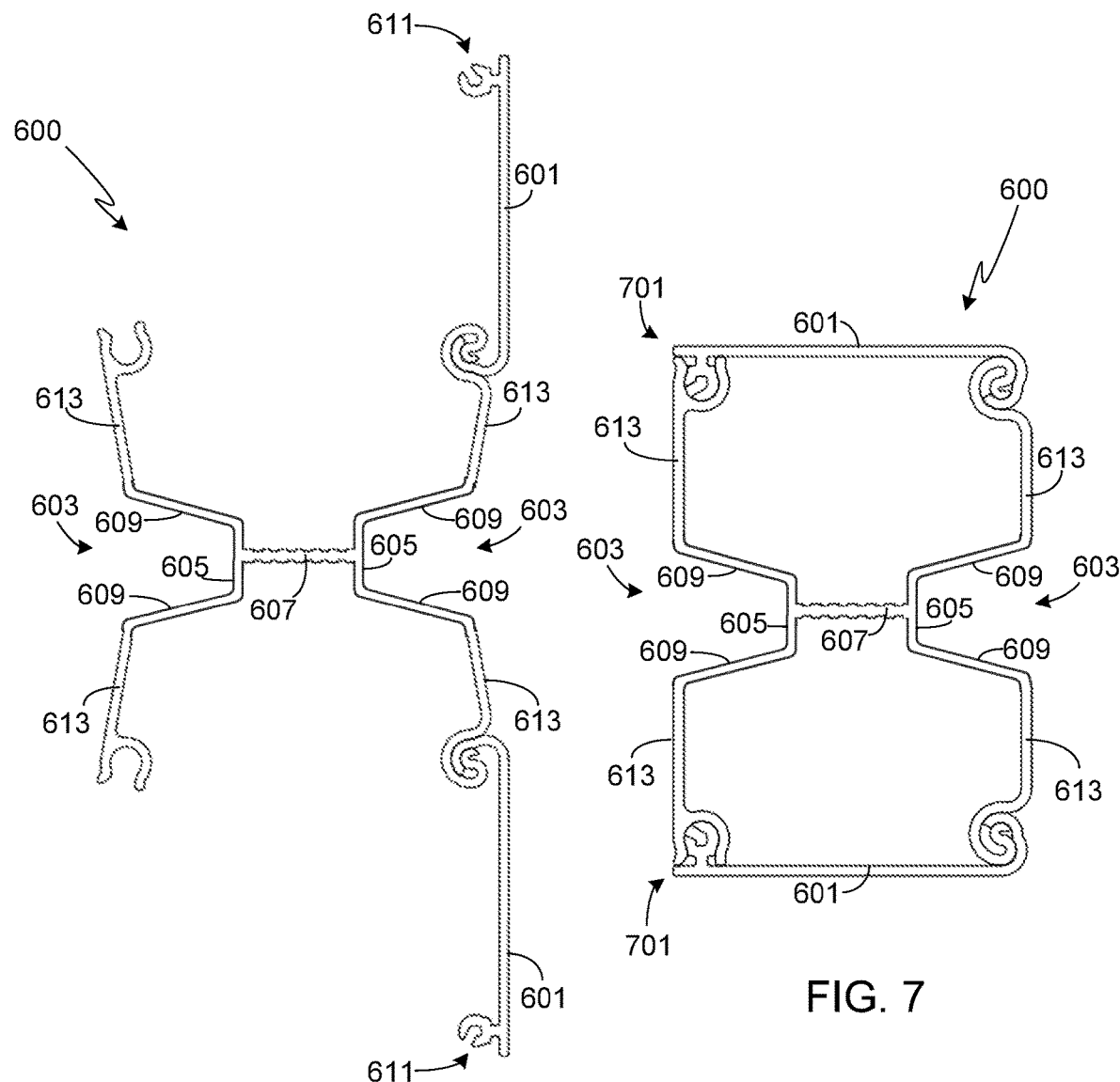
FIG. 6 provides a cross-sectional view of a preferred configuration for a multi-piece tower assembly for use with the invention, this view showing both face plates in the open position.
FIG. 7 provides a cross-sectional view of the preferred configuration for the multi-piece tower assembly shown in FIG. 6, this view showing both face plates in the closed position.

FIGS. 6 and 7 provide cross-sectional views of a preferred multi-piece, hinged tower 600. In FIG. 6 face plates 601 are shown in an open position while in FIG. 7 the face plates are shown in a closed position. Preferably both the body portion and the face plates are extruded, and features such as the plant container cut-outs are punched during the process. As shown, the cross-section of tower 600 is slightly different from that of tower 100. Specifically, rather than a simple "V" shaped groove, modified groove 603 includes an inner groove wall 605 which, due to rear tower cavity wall 607, exhibits improved rigidity in this region of the groove. Sloped groove walls 609 of modified groove 603 retain a V-shape as in the previously described and illustrated tower grooves. The hinged tower faces 601 are substantially the same, if not identical, to the tower faces 101 of tower 100 and operate in the same manner as those described in U.S. patent application Ser. No. 15/968,425. In the preferred embodiment, each face plate is attached to the body of the hydroponic tower using snap-fit fasteners 701.

Figure 8:
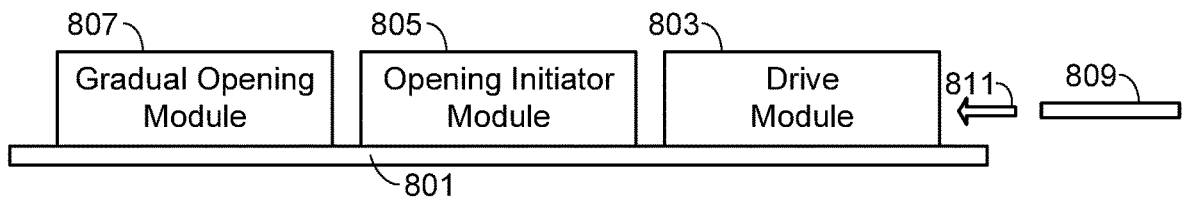
FIG. 8 provides a diagram of the basic operational units of the opening apparatus in accordance with a preferred embodiment of the invention.

FIG. 8 provides a diagram of the basic operational units of the opening apparatus in accordance with a preferred embodiment of the invention. It a preferred operational embodiment, the opening apparatus follows the plant harvester and precedes the tower cleaning system that removes the plant plug matter and cleans the tower. As such, the opening apparatus does not need to be sterile, although preferably it is washdown safe (i.e., built to IP65 or higher standards) in order to simplify cleaning and maintenance. In at least one embodiment, the operational units are attached to a mounting base 801, thus providing stability and rigidity to the overall structure and ensuring that the various components of the system remain aligned.

The first portion of the tower opening system is the drive unit 803. As described in detail below, the drive unit is designed to propel the hydroponic tower through the opening apparatus. The drive unit also ensures proper alignment of the tower relative to the opening system. The second portion 805 of the opening system is used to initiate tower opening. Constraining rollers, described below, limit the degree to which the tower faces are allowed to open relative to the tower body. The third portion 807 of the opening system gradually opens the tower faces relative to the tower body. Note that in this configuration, a closed tower assembly 809 enters the opening system from the right and passes through the system in a direction 811.

Figure 9:
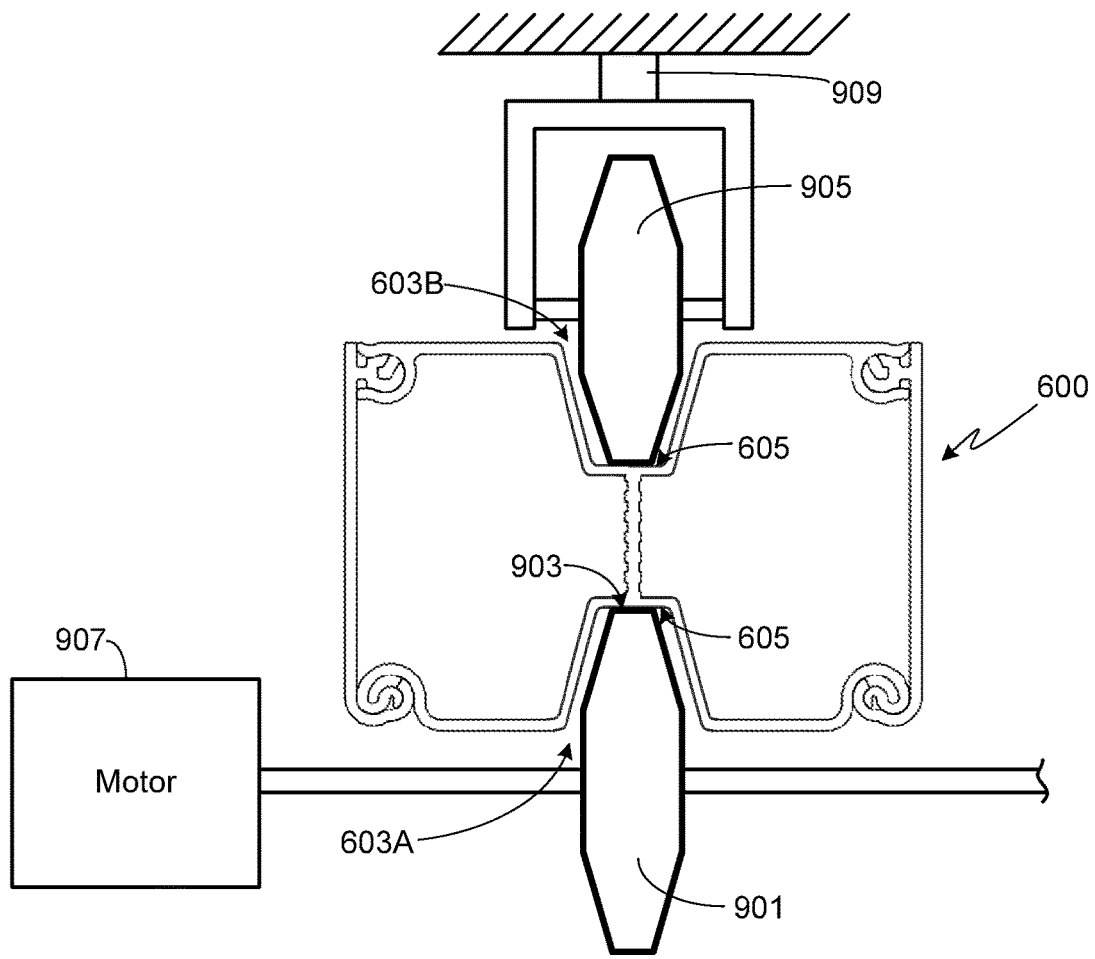
FIG. 9 illustrates the drive unit of the tower opening system of the invention, this figure providing a simplified cross-sectional view of the multi-piece tower assembly shown in FIG. 7 along with a pair of drive rollers.

In the preferred embodiment of the invention, drive rollers are pressed against the face of wall 605 of the modified V-shaped groove that runs the length of the tower body. As shown in the cross-sectional view provided in FIG. 9, assuming a dual-sided tower that utilizes the modified V-shape groove 603 shown in FIGS. 6 and 7, a drive roller 901 fits within one of the tower's grooves 603 such that the face 903 of drive roller 901 presses against wall 605 of groove 603A. Preferably face 903 of drive roller 901 is substantially flat, thereby providing greater contact area with wall 605 of the groove. A second drive roller 905 presses against wall 605 of groove 603B, where grooves 603A and 603B are complimentary modified V-shaped grooves located on either side of the tower body. One of the drive rollers (e.g., drive roller 901) is coupled to a drive motor 907 while the second drive roller (e.g., drive roller 905) is preferably not driven and is used to apply pressure against the tower, thus ensuring that the drive wheel coupled to the motor remains in contact with wall 605 of the groove and that rotation of the motorized drive wheel forces forward movement of the tower through the tower opening apparatus. The second drive roller is preferably coupled to a tensioner 909 (e.g., pneumatic or spring coupler) in order to ensure that sufficient force is applied by the second drive roller, thereby forcing the tower against the motorized drive roller. The motorized drive roller, and in some embodiments both drive rollers, is fabricated from a material with a relatively high coefficient of friction. Typically a polyurethane material is used for the motorized drive roller, and in some cases for both drive rollers, with a kinetic coefficient of friction that is preferably greater than 1. In some applications a material with a high coefficient of friction (e.g., polyurethane, rubber, etc.) is applied to the outer layer of the drive roller(s).

In addition to drive rollers, the operating apparatus of the invention preferably utilizes one or more alignment rollers that ensure that the tower remains correctly aligned as it passes through the opening apparatus. Preferably the alignment rollers are located within the opening apparatus in pairs, where each pair includes an alignment roller located on one side of the tower (e.g., above the tower) and a complimentary alignment roller located on the opposing tower side (e.g., below the tower). Utilizing complementary roller pairs, and preferably multiple complimentary roller pairs, enhances tower stability and alignment within the opening apparatus.

Figure 10:
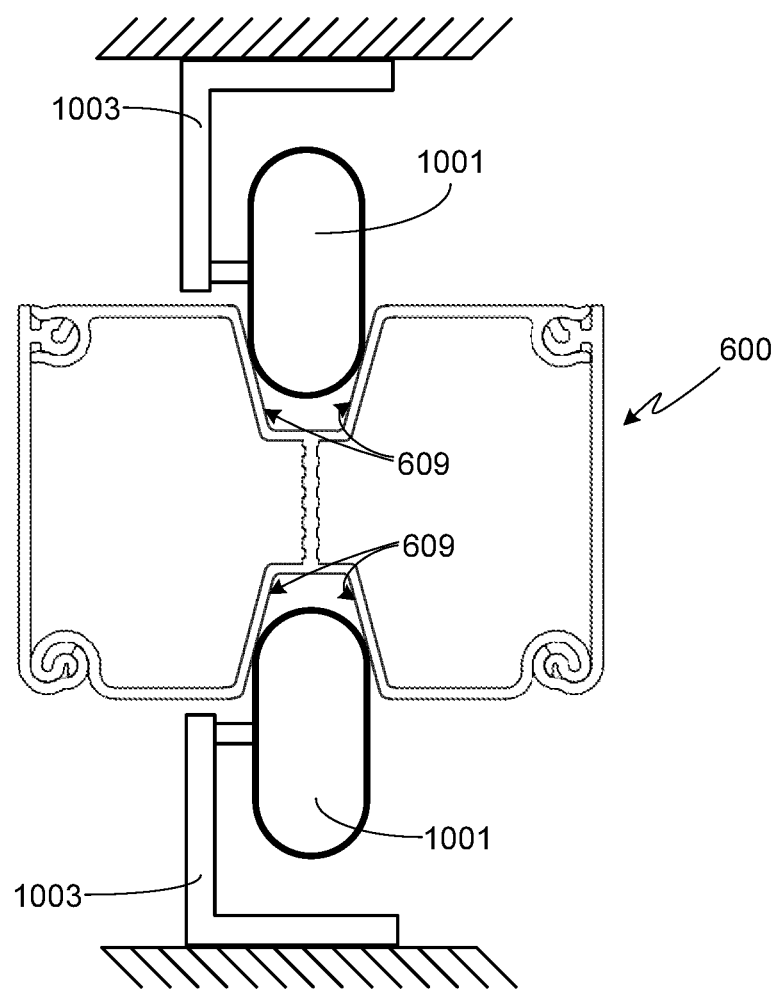
FIG. 10 illustrates a pair of alignment rollers relative to the multi-piece tower assembly shown in FIG. 7, this figure providing a simplified cross-sectional view of the assembly.

In the preferred embodiment, and as illustrated in the cross-sectional view provided by FIG. 10, the alignment rollers 1001 fit within the modified V-shaped grooves that run the length and on either side of the tower. Preferably the alignment rollers 1001 have a more rounded profile than the drive rollers, thereby contacting the sloped side walls 609 of the groove rather than groove face 605. Although the alignment rollers 1001 may be coupled to pneumatic or spring couplers in order to force contact between the roller surfaces and the tower grooves, the inventors have found that active roller mountings are not required and that the alignment rollers can be mounted using static mounts 1003 as shown. In general, the alignment rollers are mounted on axles which are supported by pillow blocks. The axles can also be supported by shaft mounts, or the wheels can be supported by shoulder bolts in a plate or similar mount. As rollers 1001 only perform the function of tower alignment, not tower motion, the inventors have found that the material used to fabricate the rollers is not critical. Preferably a plastic material, for example a thermoplastic such as Delrin®, is used to fabricate the alignment rollers.

Although not preferred, the inventors have envisioned the use of other alignment strategies with the tower. For example, one or more sides of the tower can be held in place using plates (e.g., nylon plates) or a combination of rollers and plates.

Figure 11:
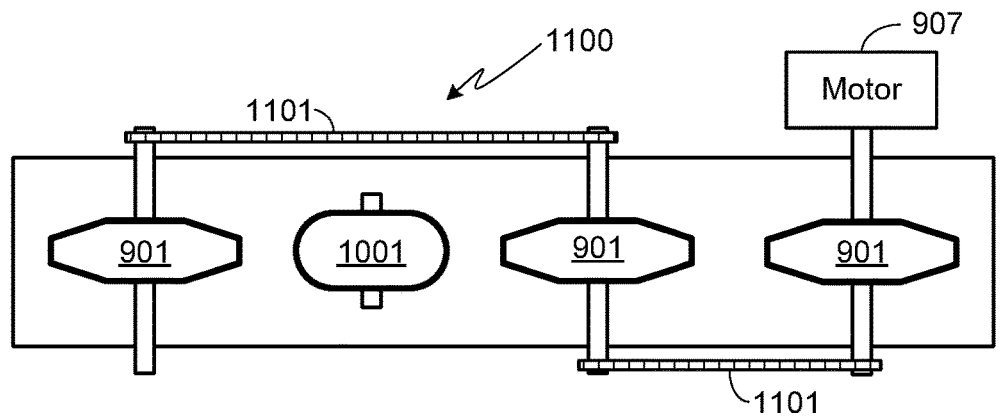
FIG. 11 provides a simplified top-down view of a first configuration for the drive unit of the invention.
Figure 12:
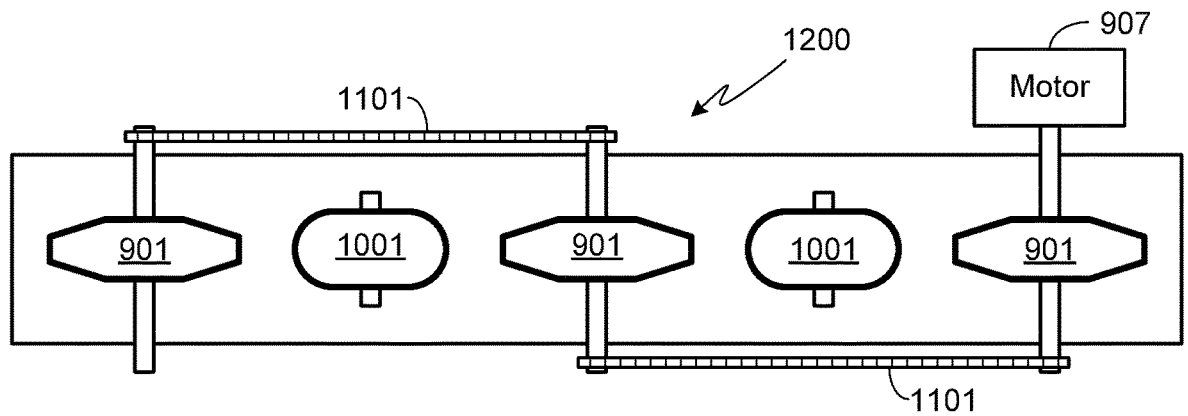
FIG. 12 provides a simplified top-down view of a second configuration for the drive unit of the invention.
Figure 13:
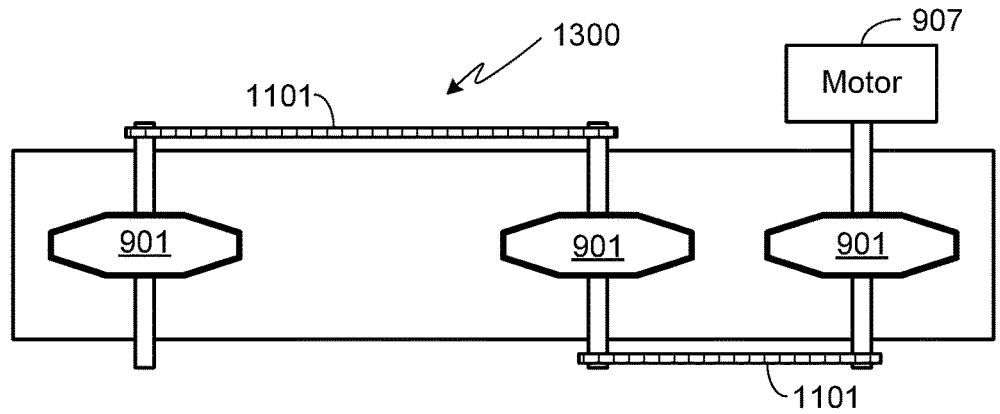
FIG. 13 provides a simplified top-down view of a third configuration for the drive unit of the invention.

As previously noted, while utilizing the basic operational units of the tower opening system, the present invention can be modified to accommodate various tower configurations, thus allowing the system to be used with hydroponic towers of different dimensions, different alignment groove configurations, various hinge mechanisms and both dual and single-sided towers. FIGS. 11-13 provide simplified top-down views of three different configurations for the drive unit of the invention, each using drive rollers as described above and illustrated in FIG. 9. Exemplary drive units 1100 and 1200 also include alignment rollers as described above and illustrated in FIG. 10. Exemplary drive unit 1300 does not include any dedicated alignment rollers, instead relying on the drive rollers to achieve tower alignment during this stage of the tower opening procedure. In each of these drive units only a single drive roller 901 is directly coupled to motor 907, the remaining drive rollers 901 being indirectly coupled to the motor via belt drives 1101. Preferably belt drives 1101 utilize a metal chain belt, an elastomer v- or multi-ribbed belt, or a polyurethane v- or multi-ribbed-belt.

The second primary operational unit of the opening system initiates opening of the hinged tower face from the tower body. Assuming the use of a dual-sided hydroponic tower as preferred, preferably the two hinged tower faces are simultaneously opened as described and illustrated below.

Figure 14:
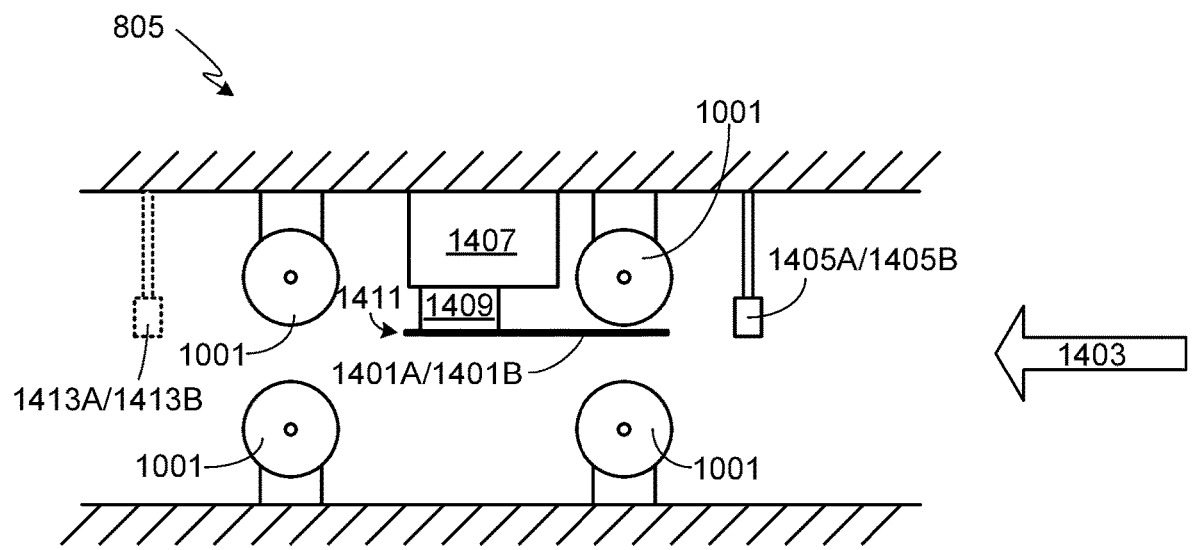
FIG. 14 provides a simplified cross-sectional view of a preferred embodiment of the tower opening initiation module.
Figure 15:
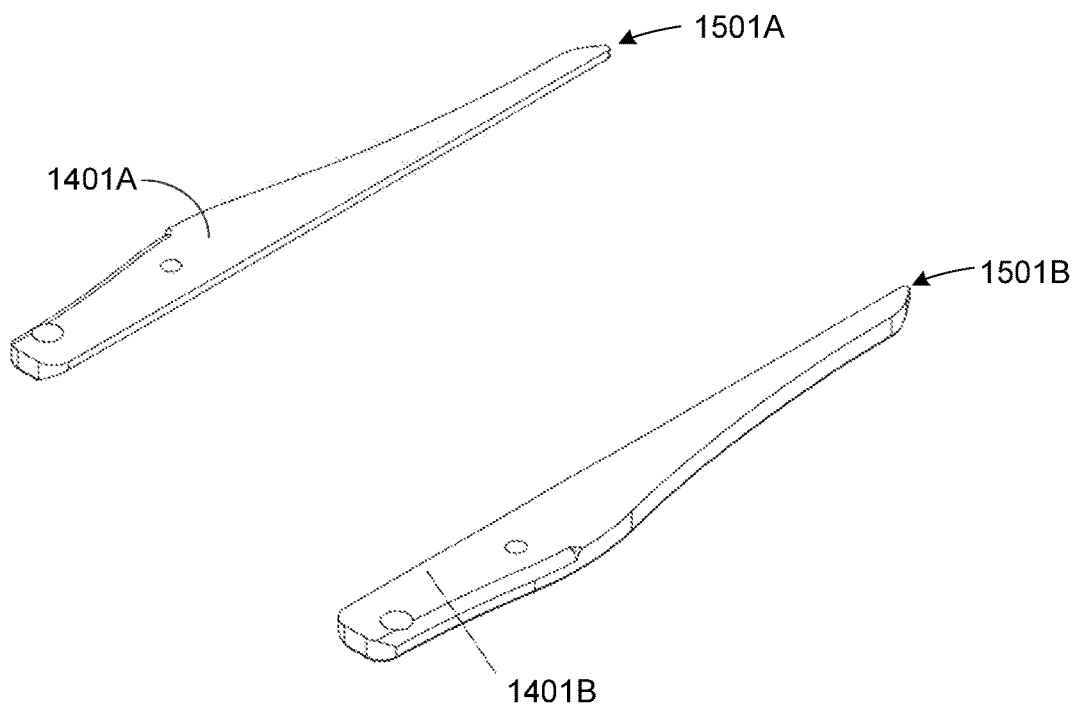
FIG. 15 provides isometric views of the opening wedges employed in the tower opening initiation module shown in FIG. 14.
Figure 16:
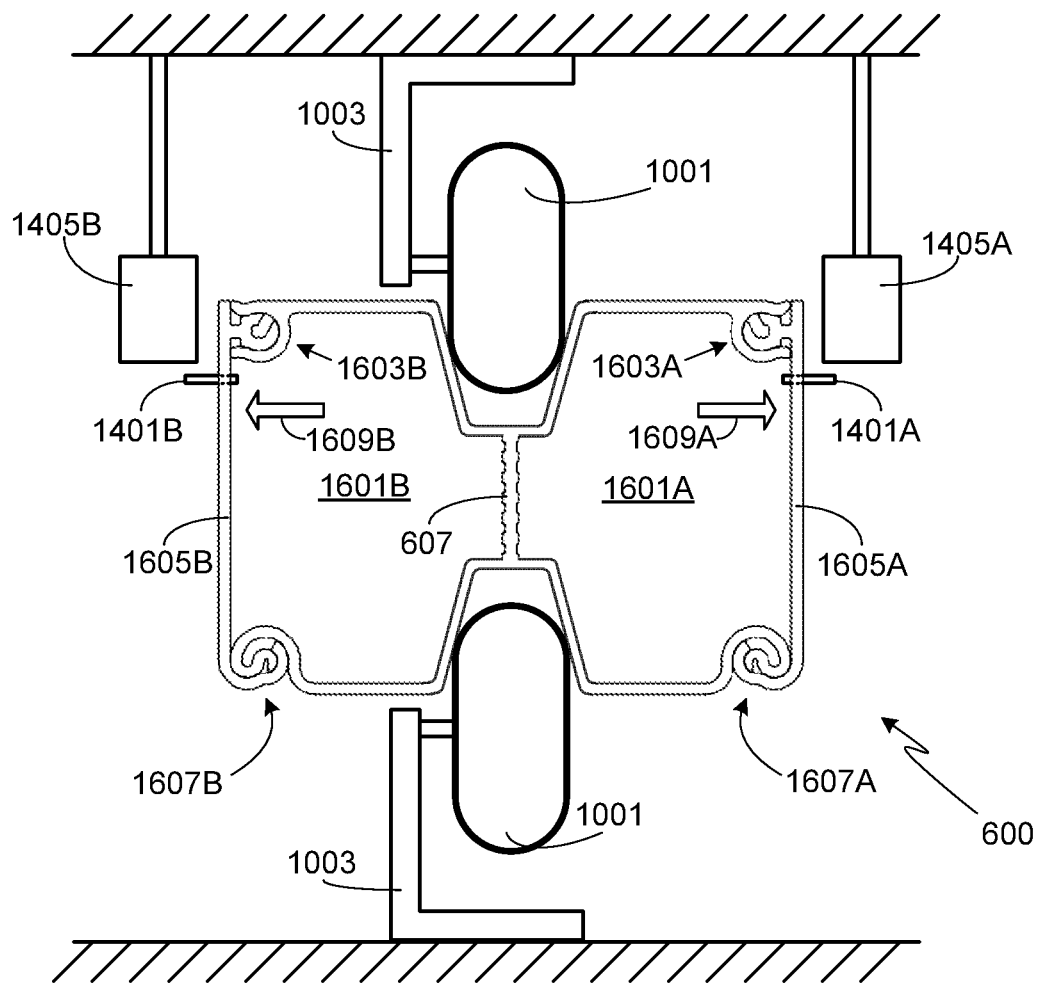
FIG. 16 provides an end view of the primary components of the tower opening initiation module shown in FIG. 14 relative to the multi-piece tower assembly shown in FIG. 7.

FIG. 14 provides a simplified cross-sectional side view of a preferred embodiment of the tower opening initiation module 805. Assuming a dual-sided hydroponic tower as preferred, a pair of wedge members 1401A/1401B is used to pry or un-snap the tower faces from the tower body. FIG. 15 provides an isometric view of wedge members 1401A and 1401B while FIG. 16 provides a simplified end view of this portion of the opening apparatus relative to a multi-piece tower 600 prior to the initiation of tower opening.

As shown, the leading edge 1501A of wedge member 1401A is inserted into the corresponding tower cavity 1601A while leading edge 1501B of wedge member 1401B is inserted into tower cavity 1601B. In one preferred embodiment, the leading edge of each wedge member is inserted just below the corresponding snap-fit fastener. In an alternate preferred embodiment, the leading edge of each wedge member is inserted more towards the center of the cavity. As the drive unit moves the tower through the opening apparatus in a direction 1403, the curved shape of wedge member 1401A gradually forces tower face 1605A to rotate about hinge member 1607A and move outward in a direction 1609A. Similarly, wedge member 1401B forces tower face 1605B to rotate about hinge member 1607B and move outward in a direction 1609B as the tower is forced through the opening apparatus.

Although the wedge members must enter the tower as noted above, clearly neither the wedge members nor their mounting hardware can be allowed to interfere with tower movement. As such, the wedges must be thin to be non-interfering, especially in the preferred embodiment in which the plant plug holders are attached to the tower face, while being thick enough to be stiff and robust, thus allowing them to successfully unsnap the tower faces. In at least one embodiment, each wedge member is approximately 0.188 inches thick. Preferably each wedge member 1401A/1401B is mounted to a baseplate 1407 via a wedge shaped bracket 1409, or via mounting pins (not shown). Bracket 1409 is configured to be progressively larger towards the exit end of the wedge members (i.e., end region 1411), the increase in bracket size corresponding to the increase in space between the tower face and the tower body as the face hinges open.

The inventors have found that in some configurations, primarily depending upon the specific design of the tower face fasteners, once tower face opening is initiated the tower face may open more quickly than desired. Premature tower opening is especially problematic when the plant plug holders are attached to the tower face(s) as they may interfere with the various components of the opening apparatus. Accordingly in a preferred embodiment of the invention, a pair of idler rollers 1405A and 1405B are used to constrain the opening of tower faces 1605A and 1605B, respectively. As shown in FIG. 14, idler rollers 1405A/1405B precede wedges 1401A/1401B. As a result, once a wedge un-snaps or otherwise forces open the corresponding tower face, the idler roller limits the degree to which the tower face can open relative to the tower body, thereby preventing premature opening of the tower. In the embodiment illustrated in FIGS. 18 and 19, the shaft onto which each idler roller is mounted is attached to a mounting bracket 1801. While a single idler roller is shown per wedge in FIGS. 16, 18 and 19 as preferred, the inventors have found that in some configurations a second idler roller may be necessary, the second idler roller installed after the wedge member, rather than before the wedge members as with idler rollers 1405A/1405B. The second set of idler rollers, if used, prevent the tower face from opening more than desired at this stage of operation. For clarity a second idler roller is shown in phantom in FIG. 14 (e.g., secondary idler rollers 1413A/1413B).

Figure 17:
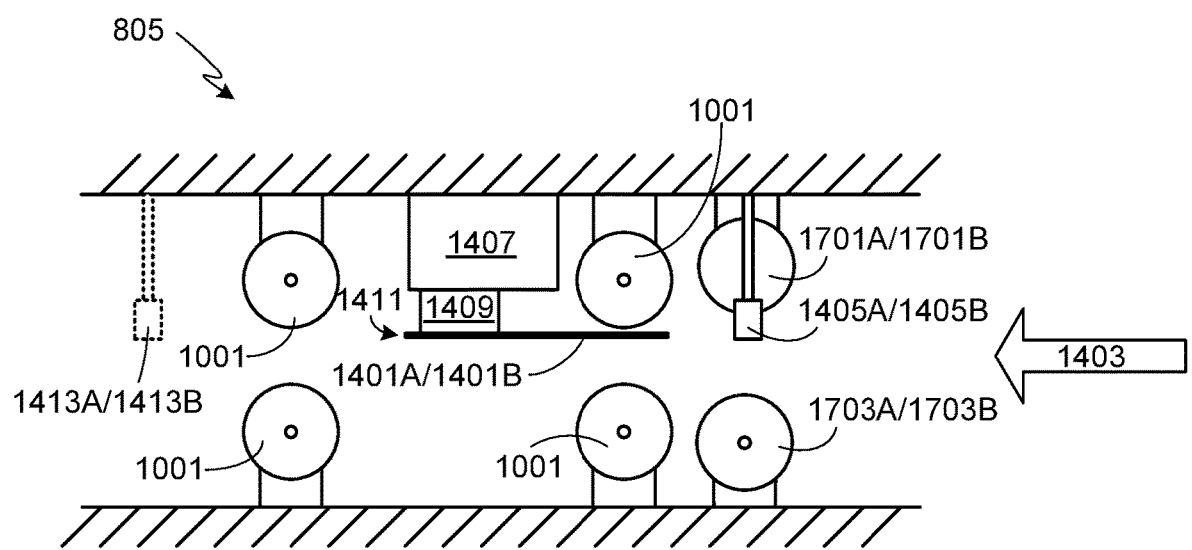
FIG. 17 provides a simplified cross-sectional view, similar to that provided by FIG. 14, of an alternate preferred embodiment of the tower opening initiation module.
Figure 18:
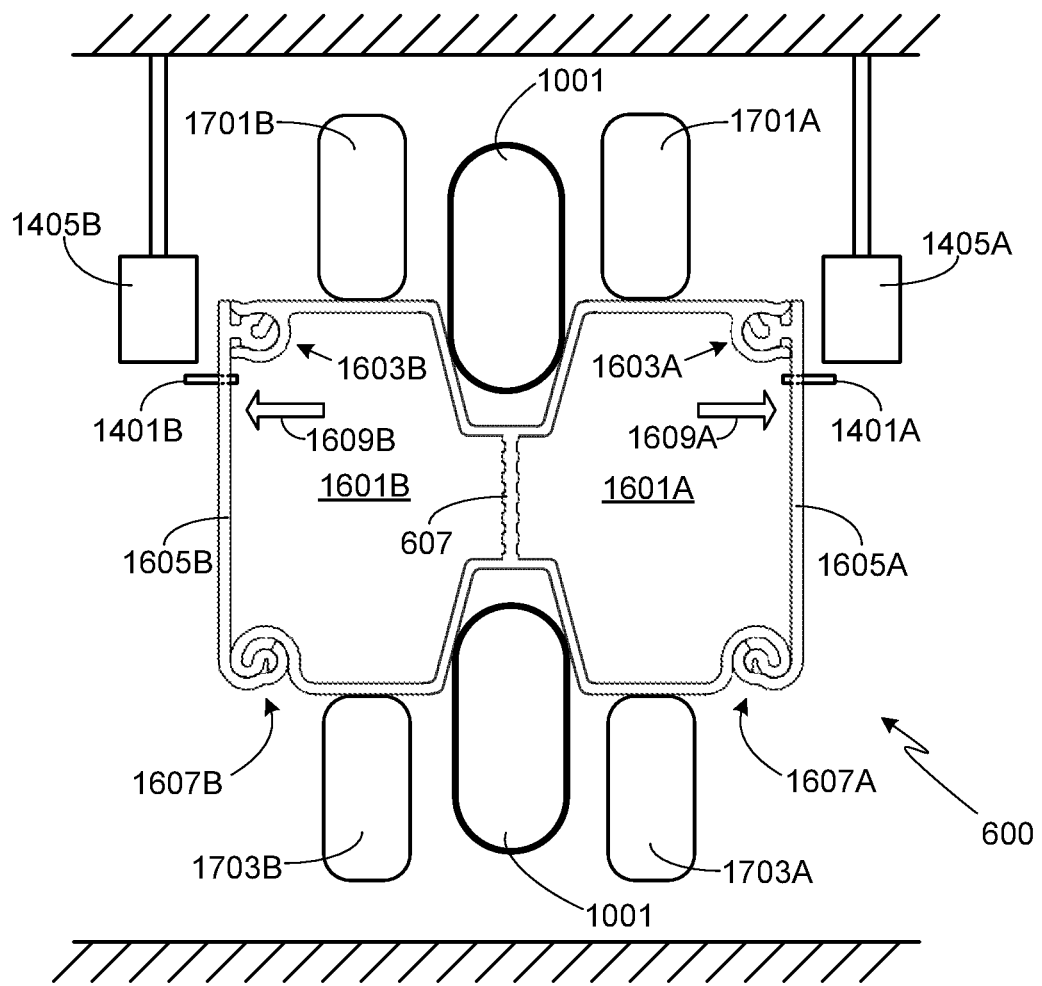
FIG. 18 provides an end view of the primary components of the tower opening initiation module shown in FIG. 17 relative to the multi-piece tower assembly shown in FIG. 7.

FIGS. 17 and 18 illustrate a slight modification of tower opening initiation module 805, the modification providing additional stability during the tower opening sequence. As shown, a pair of tower body alignment rollers 1701A/1701B is positioned on one side of the tower, preferably above the tower as shown, and a second pair of tower body alignment rollers 1703A/1703B is positioned on the opposite side of the tower, preferably below the tower as shown. In some embodiments, a single pair of tower body alignment rollers is added to the tower opening initiation module 805. If only a single pair of tower body alignment rollers is added to module 805, preferably it is located closest to the snap-fit fasteners (i.e., rollers 1701A/1701B). The tower body alignment rollers are configured to locate and align the upper and lower sides of the tower (assuming the tower is positioned within the opening apparatus as shown), preferably locating the tower side walls 613 at an approximately 90 degree angle relative to tower back wall 607. Note that these alignment rollers contact the tower side walls 613, not the modified V-shaped grooves, as shown. Additionally, to simplify and thus clarify FIG. 18, mounting hardware is not shown for alignment rollers 1001, tower body alignment rollers 1701A, 1701B, 1703A and 1703B, and wedge members 1401A and 1401B.

Figure 19:
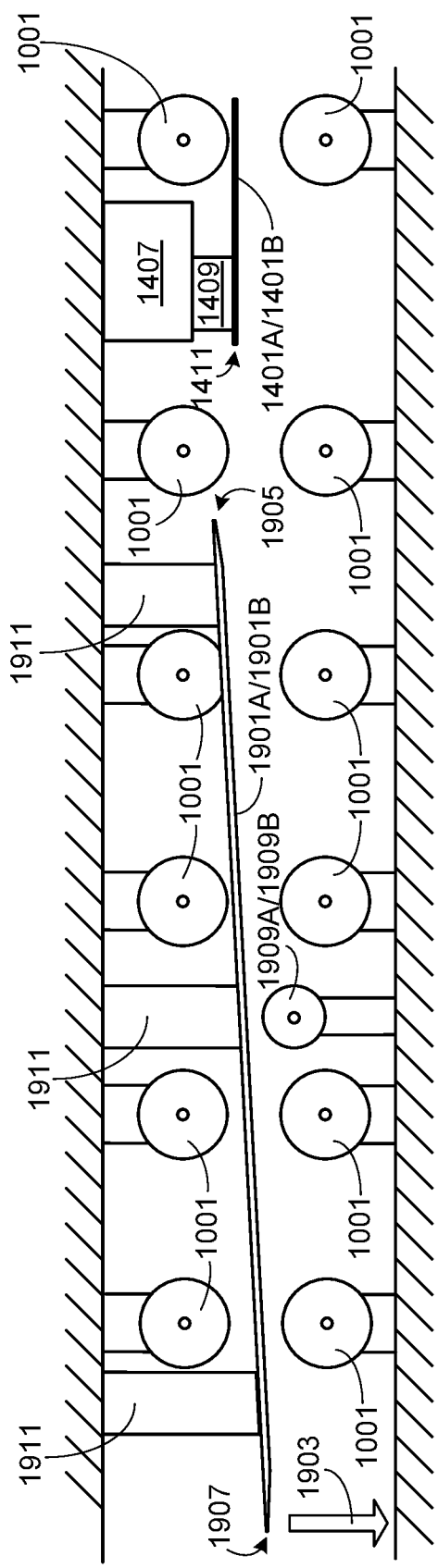
FIG. 19 provides a simplified cross-sectional view of a preferred embodiment of the third operational module of the opening apparatus of the invention.
Figure 20:
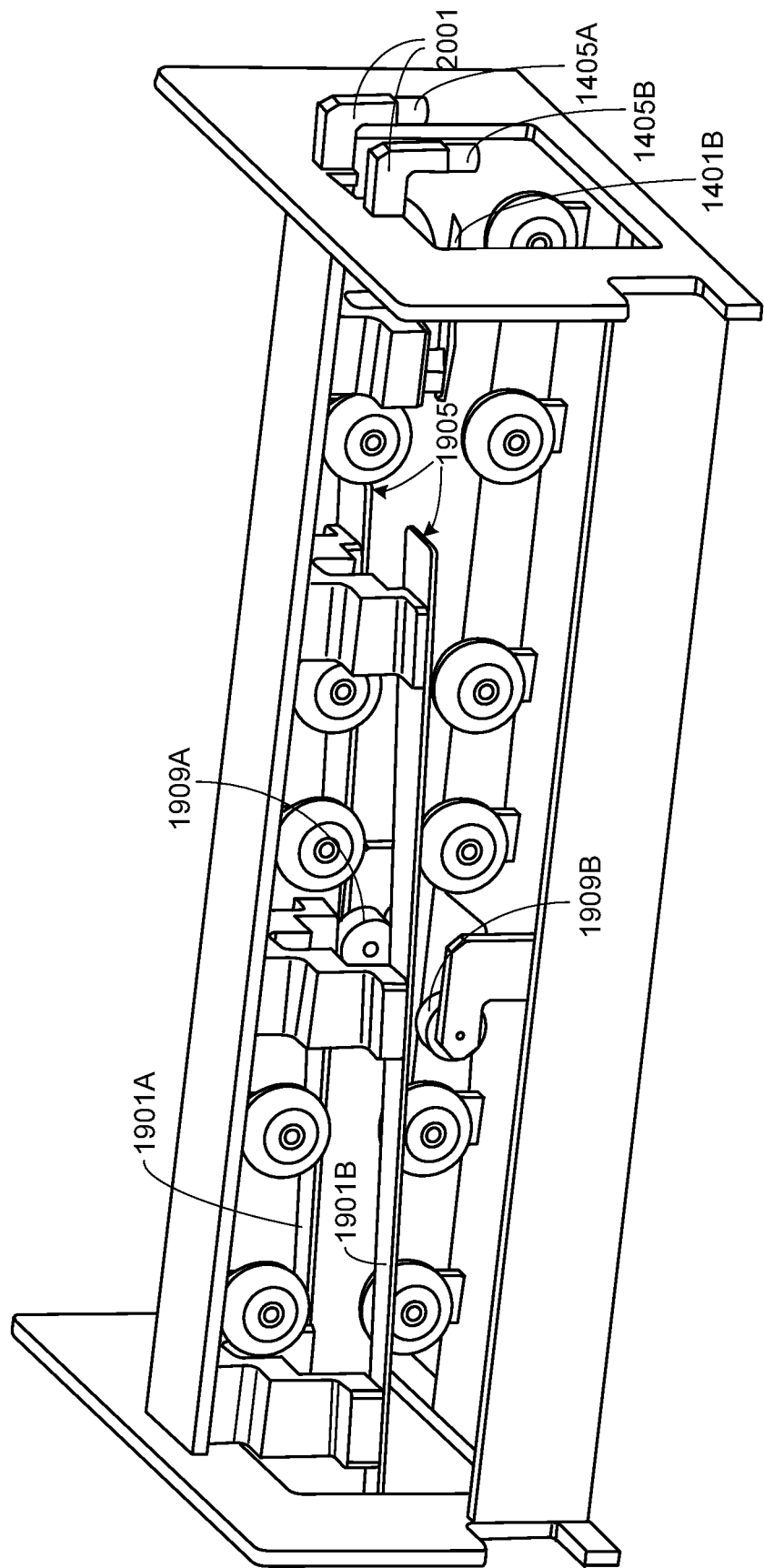
FIG. 20 provides an isometric view of the third operational module shown in FIG. 19.
Figure 21:
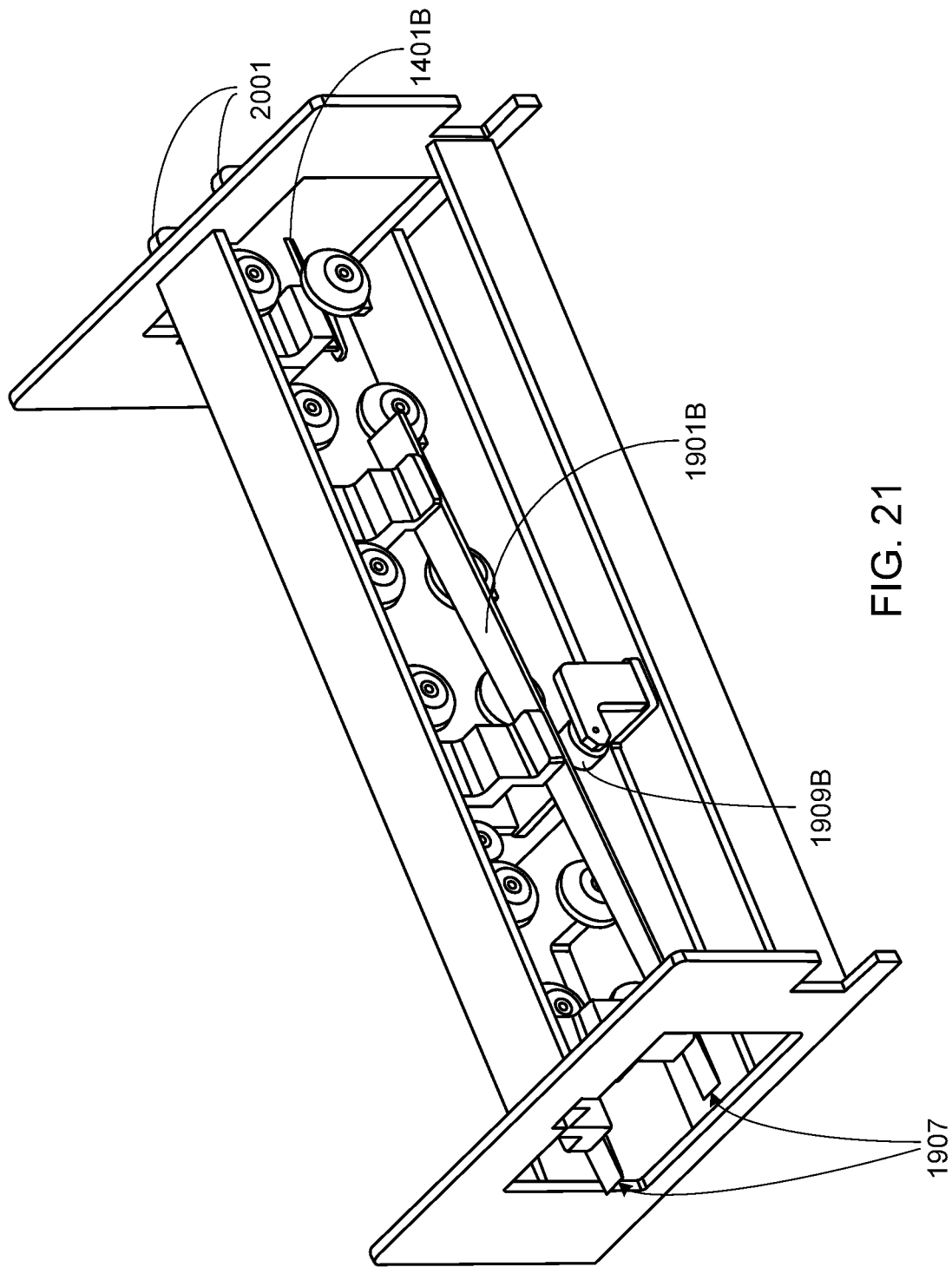
FIG. 21 provides a second isometric view of the third operational module shown in FIG. 19.

The third primary operational unit of the opening system completes the opening process, lowering each tower face 1605 from the initial partially open position generated by wedge members 1401A/B to the fully open position, where the fully open position is preferably located at the point at which each tower face 1605 is at an approximately 90 degree angle relative to tower back wall 607. As illustrated in FIGS. 19-21, the third operational unit uses two longitudinal ramps 1901A/1901B, assuming a dual-sided hydroponic tower as preferred, to gradually lower the tower faces 1605A/1605B.

Ramps 1901A/1901B are downwardly sloped as shown. As a result, each tower face 1605A/1605B is gradually forced in a downward direction 1903 as the edge of the tower face, and more preferably as the snap gland 611 of each tower face, passes under the corresponding ramp 1901A/1901B. Preferably the leading edge 1905 of each ramp is shaped, i.e., sloped, in order to present a narrow edge to the tower face/snap gland as it approaches the ramp. In the preferred embodiment each ramp 1901A/1901B is curved, presenting a wider leading edge 1905 than trailing edge 1907. The curvature of the ramps is primarily driven by the plant plug containers 303 which require more space to pass as the tower faces are lowered and as the vertical height of the sloped ramps decreases.

As shown in the figures, multiple pairs of alignment roller 1001 are used throughout the third operational unit to ensure that the tower remains properly aligned as the longitudinal ramps lower each tower face. In at least one embodiment of the invention, and as illustrated, the third operational unit also includes a pair of idler rollers 1909A and 1909B. Idler rollers 1909A/1909B constrain the tower faces so that they do not open prematurely since premature opening of a tower face could lead to a plant plug container 303 interfering with one of the longitudinal ramps rather than passing smoothly by the ramp.

Preferably longitudinal ramps 1901A/1901B are fabricated from approximately 0.188 inch thick stainless steel. The ramps can be bolted, welded, or otherwise attached to the apparatus via mounting brackets 1911.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A plant growth tower opening apparatus configured to open a multi-piece plant growth tower, said plant growth tower opening apparatus comprising:
 a first member configured to be inserted into a first tower cavity to unlatch a first tower face plate from a tower body and to move said first tower face plate from a first tower cavity closed position toward a first tower cavity open position as said plant growth tower is propelled through said plant growth tower opening apparatus,
 wherein said plant growth tower includes said tower body that defines at least said first tower cavity, said first tower face plate is hingeably coupled to said tower body, said first tower face plate is positionable relative to said tower body in at least said first tower cavity closed position and said first tower cavity open position.

2. The plant growth tower opening apparatus of claim 1, wherein said first member is configured to release a first fastener of said tower and unlatch a first tower face plate of said tower from said tower body as said plant growth tower is propelled through said plant growth tower opening apparatus, wherein and said first fastener is configured to temporarily latch said first tower face plate to said tower body when said first tower face plate is in said first tower cavity closed position.

3. The plant growth tower opening apparatus of claim 2, wherein said first member is configured to be inserted into said first tower cavity as said multi-piece plant growth tower is propelled through said plant growth tower opening apparatus, said first member is configured to release said first fastener and unlatch said first tower face plate from said tower body and move said first tower face plate from said first tower cavity closed position toward said first tower cavity open position as said multi-piece plant growth tower passes by said first member while being propelled through said plant growth tower opening apparatus.

4. The plant growth tower opening apparatus of claim 1, further comprising at least one set of tower body alignment components, said at least one set of tower body alignment components comprising a first tower body alignment component and a second tower body alignment component, said first tower body alignment component located on a first side of said tower body and configured to align said first side of said tower body, and said second tower body alignment component located on a second side of said tower body and configured to align said second side of said tower.

5. The plant growth tower opening apparatus of claim 1, further comprising an idler component, said idler component located closer to an entrance of said plant growth tower opening apparatus than said first member, said idler component configured to limit movement of said first tower face plate toward said first tower cavity open position after said multi-piece plant growth tower passes by said first member.

6. The plant growth tower opening apparatus of claim 1, further comprising an idler component, said idler component located further from an entrance of said plant growth tower opening apparatus than said first member, said idler component configured to limit movement of said first tower face plate toward said first tower cavity open position after said multi-piece plant growth tower passes by said first member.

7. The plant growth tower opening apparatus of claim 1, further comprising a first longitudinal ramp, said first longitudinal ramp sloped within said plant growth tower opening apparatus, said first longitudinal ramp located further from an entrance of said plant growth tower opening apparatus than said first member, said first longitudinal ramp configured to continue to force movement of said first tower face plate toward said first tower cavity open position, wherein said first member forces said first tower face plate to a partially open position and said first longitudinal ramp forces said first tower face plate to a fully open position relative to said tower body.

8. The plant growth tower opening apparatus of claim 7, wherein said first tower face plate in said fully open position corresponds to said first tower cavity open position.

9. The plant growth tower opening apparatus of claim 7, further comprising an idler component, said idler component located adjacent to a portion of said first longitudinal ramp, said idler component configured to control movement of said first tower face plate toward said first tower cavity open position as said multi-piece plant growth tower passes by said first longitudinal ramp.

10. The plant growth tower opening apparatus of claim 1, further comprising a plurality of drive components, wherein at least a subset of said plurality of drive components is coupled to a drive actuator and configured to contact said tower body along at least a first tower body side, wherein operation of said drive actuator causes said subset of said plurality of drive components to propel said multi-piece plant growth tower through said plant growth tower opening apparatus.

11. The plant growth tower opening apparatus of claim 10, further comprising a plurality of alignment components configured to contact said tower body along at least a second tower body side.

12. The plant growth tower opening apparatus of claim 1, said multi-piece plant growth tower further comprising:
 a first groove running along the length of a first side of said tower body, said first groove comprising a first inner groove wall, a first sloped groove wall coupling a first edge of said first inner groove wall to a first edge of said first side of said tower body, and a second sloped groove wall coupling a second edge of said first inner groove wall to a second edge of said first side of said tower body; and
 a second groove running along the length of a second side of said tower body, said second groove comprising a second inner groove wall, a third sloped groove wall coupling a first edge of said second inner groove wall to a first edge of said second side of said tower body, and a fourth sloped groove wall coupling a second edge of said second inner groove wall to a second edge of said second side of said tower body.

13. The plant growth tower opening apparatus of claim 12, wherein said first inner groove wall is substantially parallel to said first side of said tower body and substantially perpendicular to a first tower cavity rear wall, and said second inner groove wall is substantially parallel to said second side of said tower body and substantially perpendicular to said first tower cavity rear wall.

14. The plant growth tower opening apparatus of claim 12, further comprising a plurality of drive components, wherein a first subset of said plurality of drive components is coupled to a drive actuator and configured to contact said tower body within said first groove, wherein operation of said drive actuator forces movement of said first subset of said plurality of drive components to cause propulsion of said multi-piece plant growth tower through said plant growth tower opening apparatus, wherein a second subset of said plurality of drive components is not coupled to said drive actuator, wherein said second subset of said plurality of drive components is configured to contact said tower body within said second groove.

15. The plant growth tower opening apparatus of claim 14, wherein said first subset of said plurality of drive components contacts said first inner groove wall of said first groove, and wherein said second subset of said plurality of drive components contacts said second inner groove wall of said second groove.

16. The plant growth tower opening apparatus of claim 15, wherein each drive component of said second subset of said plurality of drive components is mounted via a tensioner and configured to apply pressure to said tower body via said second inner groove wall of said second groove.

17. The plant growth tower opening apparatus of claim 12, further comprising a plurality of alignment components, said plurality of alignment components configured within said plant growth tower opening apparatus as alignment component pairs, wherein a first alignment component of each alignment component pair is configured to contact said tower body within said first groove, and wherein a second alignment component of each alignment component pair is configured to contact said tower body within said second groove.

18. The plant growth tower opening apparatus of claim 17, wherein said first alignment component of each alignment component pair contacts said first sloped groove wall and said second sloped groove wall corresponding to said first groove, and wherein said second alignment component of each alignment component pair contacts said third sloped groove wall and said fourth sloped groove wall corresponding to said second groove.

19. The plant growth tower opening apparatus of claim 12, wherein said multi-piece plant growth tower is a dual-sided plant growth tower, wherein said tower body defines said first tower cavity and a second tower cavity, wherein said first tower face plate is hingeably coupled to said tower body via a first hinge member, said first hinge member corresponds to said first tower cavity, said tower body further comprising a second hinge member corresponding to said second tower cavity, said multi-piece plant growth tower further comprising:
 a second tower face plate, wherein said second tower face plate is hingeably coupled to said tower body via said second hinge member, wherein said second tower face plate is positionable relative to said tower body in at least a second tower cavity closed position and a second tower cavity open position, said first tower face plate comprises a first plurality of plant container supports configured to accept a first plurality of plant containers, and said second tower face plate comprises a second plurality of plant container supports configured to accept a second plurality of plant containers; and
 a second fastener configured to temporarily latch said second tower face plate to said tower body when said second tower face plate is in said second tower cavity closed position,
 wherein said tower opening apparatus is further configured to (i) release said second fastener and unlatch said second tower face plate from said tower body, and (ii) move said second tower face plate from said second tower cavity closed position to said second tower cavity open position.

20. The plant growth tower opening apparatus of claim 19, said first groove centered between said first tower cavity and said second tower cavity, and said second groove centered between said first tower cavity and said second tower cavity.

21. The plant growth tower opening apparatus of claim 1, further comprising a drive actuator configured to propel said multi-piece plant growth tower through said plant growth tower opening apparatus.

22. The plant growth tower opening apparatus of claim 21, further comprising an alignment system configured to align said multi-piece plant growth tower body within said plant growth tower opening apparatus.

23. The tower opening apparatus of claim 1, further comprising said plant growth tower.

24. The plant growth tower opening apparatus of claim 1, wherein the first member comprises a wedge.

25. A method for opening a multi-piece plant growth tower, said method comprising inserting a first member into a first tower cavity to unlatch a first tower face plate from a tower body and to move said first tower face plate from a first tower cavity closed position toward a first tower cavity open position as said plant growth tower is propelled through said plant growth tower opening apparatus, wherein said plant growth tower includes said tower body that defines at least said first tower cavity, said first tower face plate is hingeably coupled to said tower body, said first tower face plate is positionable relative to said tower body in at least said first tower cavity closed position and said first tower cavity open position.

* * * * *